US008866666B2

(12) United States Patent
Nakahama

(10) Patent No.: US 8,866,666 B2
(45) Date of Patent: Oct. 21, 2014

(54) SIGNAL PROCESSING DEVICE, RADAR APPARATUS AND SIGNAL PROCESSING PROGRAM

(71) Applicant: Furuno Electric Company, Limited, Hyogo (JP)

(72) Inventor: Masahiro Nakahama, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 0 days.

(21) Appl. No.: 14/228,812

(22) Filed: Mar. 28, 2014

(65) Prior Publication Data
US 2014/0210659 A1    Jul. 31, 2014

Related U.S. Application Data

(62) Division of application No. 12/941,754, filed on Nov. 8, 2010, now Pat. No. 8,730,090.

(30) Foreign Application Priority Data

Nov. 9, 2009  (JP) ................................. 2009-256499

(51) Int. Cl.
G01S 13/00    (2006.01)
G01S 13/52    (2006.01)
G01S 7/41     (2006.01)

(52) U.S. Cl.
CPC ....................................... *G01S 7/414* (2013.01)
USPC ........ 342/90; 342/26 R; 342/26 B; 342/26 C; 342/159; 342/160; 342/179

(58) Field of Classification Search
USPC .......... 342/26 R, 26 A, 26 B, 26 C, 26 D, 41, 342/89–93, 160–162
See application file for complete search history.

(56) References Cited

U.S. PATENT DOCUMENTS

| 3,890,616 | A  | * | 6/1975  | Kojima et al. ................... 342/41 |
| 4,876,547 | A  | * | 10/1989 | Franco .......................... 342/160 |
| 4,914,441 | A  | * | 4/1990  | Brookner ....................... 342/161 |
| 5,097,268 | A  | * | 3/1992  | Bauer et al. .................... 342/160 |
| 5,594,451 | A  | * | 1/1997  | Krikorian et al. ............. 342/160 |
| 6,259,396 | B1 | * | 7/2001  | Pham et al. ..................... 342/90 |
| 6,313,785 | B1 | * | 11/2001 | Mattox ......................... 342/106 |
| 7,016,772 | B2 | * | 3/2006  | Yanagi ........................... 701/21 |
| 7,089,094 | B2 | * | 8/2006  | Yanagi ........................... 701/21 |
| 7,298,316 | B2 | * | 11/2007 | Tsai et al. ..................... 342/159 |
| 7,375,675 | B2 | * | 5/2008  | Barnum .......................... 342/90 |
| 7,515,088 | B1 | * | 4/2009  | Woodell et al. ............. 342/26 B |

(Continued)

FOREIGN PATENT DOCUMENTS

DE    43 04 027 A1    8/1994
JP    2865082 B2    12/1998

(Continued)

*Primary Examiner* — Peter Bythrow
(74) *Attorney, Agent, or Firm* — Birch, Stewart, Kolasch & Birch, LLP

(57) ABSTRACT

This disclosure provides a signal processing device, which includes a reception signal acquiring module for acquiring reception signals received by a radar antenna, an identifying module for identifying a kind of each reception signal, an extracting module for extracting the reception signal for each kind, and a kind-base signal processing module for performing individual signal processing for each kind of the extracted reception signal.

21 Claims, 4 Drawing Sheets

(56) References Cited

U.S. PATENT DOCUMENTS

| | | | |
|---|---|---|---|
| 7,741,992 B2* | 6/2010 | Wang et al. | 342/93 |
| 7,751,977 B2* | 7/2010 | Winkler et al. | 702/3 |
| 7,817,079 B1* | 10/2010 | Funk | 342/41 |
| 7,840,075 B2* | 11/2010 | Vacanti | 382/218 |
| 8,077,081 B2* | 12/2011 | Bateman et al. | 342/195 |
| 8,154,438 B1* | 4/2012 | Larson et al. | 342/145 |
| 8,180,507 B2* | 5/2012 | Dokken | 701/21 |
| 8,296,001 B1* | 10/2012 | Kabel et al. | 701/21 |
| 8,314,732 B2* | 11/2012 | Oswald et al. | 342/90 |
| 8,332,087 B2* | 12/2012 | Yannacone et al. | 701/21 |
| 2002/0057216 A1* | 5/2002 | Richardson et al. | 342/25 |
| 2003/0025627 A1* | 2/2003 | Wilson et al. | 342/26 |
| 2003/0028294 A1* | 2/2003 | Yanagi | 701/21 |
| 2005/0058021 A1* | 3/2005 | Feintuch et al. | 367/99 |
| 2006/0129288 A1* | 6/2006 | Yanagi | 701/21 |
| 2006/0290562 A1* | 12/2006 | Ehresman | 342/41 |
| 2007/0139258 A1* | 6/2007 | Tsai et al. | 342/159 |
| 2007/0273574 A1* | 11/2007 | Barnum | 342/90 |
| 2009/0096662 A1* | 4/2009 | Wang et al. | 342/93 |
| 2009/0109083 A1* | 4/2009 | Tietjen | 342/91 |
| 2009/0271054 A1* | 10/2009 | Dokken | 701/21 |
| 2009/0315756 A1* | 12/2009 | Imazu et al. | 342/41 |
| 2010/0033363 A1* | 2/2010 | Lee et al. | 342/41 |
| 2010/0073218 A1* | 3/2010 | Stockmann | 342/146 |
| 2010/0109938 A1* | 5/2010 | Oswald et al. | 342/90 |
| 2010/0188290 A1* | 7/2010 | Vacanti | 342/385 |
| 2010/0245157 A1* | 9/2010 | Wicks et al. | 342/162 |
| 2010/0289690 A1* | 11/2010 | Dai | 342/41 |
| 2011/0084870 A1* | 4/2011 | Kondo et al. | 342/41 |
| 2011/0241928 A1* | 10/2011 | Oswald et al. | 342/90 |

FOREIGN PATENT DOCUMENTS

| | | |
|---|---|---|
| JP | 11-23707 A | 1/1999 |
| JP | 2003-279641 A | 10/2003 |
| JP | 2003-315439 A | 11/2003 |

\* cited by examiner

COMPARATIVE EXAMPLE

SIGNAL PROCESSING DEVICE, RADAR APPARATUS AND SIGNAL PROCESSING PROGRAM

CROSS-REFERENCE TO RELATED APPLICATION(S)

The application is a divisional of U.S. application Ser. No. 12/941,754 filed Nov. 8, 2010, which claims priority under 35 U.S.C. §119 to Japanese Patent Application No. 2009-256499, which was filed on Nov. 9, 2009, the entire disclosure of which is hereby incorporated by reference.

TECHNICAL FIELD

The present invention mainly relates to a signal processing device for performing signal processing to a signal received by a radar antenna.

BACKGROUND

Conventionally, radar apparatuses that transmit an electromagnetic wave by a rotating antenna and receive an echo (reflection wave) from the circumference are known. Such a radar apparatus is disclosed in JP H11-023707(A) and JP 2003-279641(A), for example.

Appropriate signal processing is applied in a signal processing device to the echo signal (hereinafter, referred to as "the reception signal") received by an antenna. As such signal processing, for example, a gain control, an echo stretch (expansion processing of the echo), echo trail generation processing (tracking processing), and scan-to-scan correlation processing can be used.

Hereinafter, the gain control is briefly described as an example of the signal processing. That is, the reception signal may include, in many cases, signals unnecessary for an operator. For this reason, conventionally, predetermined signal processing is performed to the reception signal to suppress a signal level of the unnecessary signals (gain control).

The conventional gain control generally reduces the signal level of the unnecessary signals by performing suitable processing for the inputted reception signal, applies threshold processing, and then outputs the processed signal, for example. Here, the threshold processing outputs a signal having the signal level equal to or higher than a predetermined threshold level (otherwise, a signal having the signal level below the threshold level is not outputted). As described above, the signal can be outputted after the level of unnecessary signals is suppressed by the gain control.

However, the gain control has a disadvantage in which the signals "necessary" for the operator may also be suppressed when the unnecessary signals are excessively suppressed.

In the meantime, JP H11-023707(A) discloses a configuration in which only the reception signals from an ocean area are outputted by using electronic nautical chart information. Therefore, the necessary reception signals (signals from the ocean area) can be certainly outputted, thereby suppressing only the unnecessary reception signals (signals from a land area).

However, it is believed that the signals received by the antenna include various kinds of signals, such as signals indicating sea surface reflections, signals indicating rain-and-snow clutters, signals indicating echoes from other ships, signals indicating echoes from land, and signals indicating echoes from buoys or flag buoys.

In this regard, however, because the method of JP H11-023707(A) only distinguishes the ocean areas from the land areas based on the electronic nautical chart information, it cannot be applied to the control such as applying the gain control only to the sea surface reflections.

That is, the conventional signal processing device cannot perform flexible processing such as selecting an arbitrary kind of reception signal to perform the gain control. This is not limited only to the gain control, but the signal processing cannot be performed after the arbitrary kind of the reception signal is selected, also for the echo stretch, the echo trail generation processing, and the scan-to-scan correlation processing, etc.

SUMMARY

The present invention is made in view of the above situations, and provides a signal processing device that can flexibly perform signal processing according to a kind of a reception signal.

According to one aspect of the present invention, a signal processing device is provided, which includes a reception signal acquiring module for acquiring reception signals received by a radar antenna, an identifying module for identifying a kind of each reception signal, an extracting module for extracting the reception signal for each kind, and a kind-base signal processing module for performing individual signal processing for each kind of the extracted reception signal.

Thereby, suitable signal processing can be performed according to each kind of the reception signals. Further, because the reception signals are extracted for each kind, and the individual signal processing is performed for the corresponding kind, the signal processing can be prevented from affecting other kinds of reception signals. Therefore, flexible signal processing is possible, for example, when performing a gain control as the signal processing, only arbitrary kinds of the reception signals can be selectively suppressed.

The identifying module may identify at least any one of the kinds of the reception signal, the kinds including a land, a ship, a buoy, a flag buoy, a sea surface reflection, a rain-and-snow clutter, and a white noise.

The signal processing device may further comprise a map information acquiring module for acquiring map information. The identifying module may identify the kind of the reception signal based on the map information.

The identifying module may identify the reception signal indicating a land based on the map information. The kind-base signal processing module may perform signal processing, which is different from signal processing for other kinds of the reception signals, for the reception signal indicating the land.

The signal processing device may further comprise an AIS information acquiring module for acquiring AIS information. The identifying module may identify the kind of the reception signal based on the AIS information.

The identifying module may identify the reception signal indicating a ship based on the AIS information. The kind-base signal processing module may perform signal processing, which is different from signal processing for other kinds of the reception signals, for the reception signal indicating the ship.

The signal processing device may further comprise a sea surface reflection detecting module for identifying a reception signal indicating a sea surface reflection. The kind-base signal processing module may perform signal processing, which is different from signal processing for other kinds of the reception signals, for the reception signal indicating the sea surface reflection.

The signal processing device may further comprise a rain-and-snow clutter detecting module for identifying a reception signal indicating a rain-and-snow clutter. The kind-base signal processing module may perform signal processing, which is different from signal processing for other kinds of the reception signals, for the reception signal indicating the rain-and-snow clutter.

The signal processing device may further comprise a display processing module for synthesizing the reception signals for the kinds, for which the signal processing is carried out by the kind-base signal processing module, to generate a radar image.

The signal processing device may further comprise a layer storage module for storing the reception signals, for each kind for which the signal processing is carried out by the kind-base signal processing module, in layers prepared for the kinds, and a display layer selecting module for selecting some or all layers from the layers for the kinds based on an input from the exterior. The display processing module may synthesize the layers, which are selected by the display layer selecting module, to generate the radar image.

According to another aspect of the present invention, a signal processing device is provided, which includes a reception signal acquiring module for acquiring reception signals received by a radar antenna, an identifying module for identifying a kind of each reception signal, an identifier granting module for giving an identifier to the reception signal according to the kind of the reception signal, an extracting module for extracting the reception signal for each kind based on the identifier, and a kind-base signal processing module for performing individual signal processing for each kind of the extracted reception signal.

Thus, by giving the identifier to each reception signal, the reception signal can be easily extracted for each kind by the extracting module.

According to another aspect of the present invention, a radar apparatus is provided, which includes any one of the above signal processing devices, and a radar antenna module for transmitting an electromagnetic wave, receiving a reflection wave, and outputting a reception signal corresponding to the received reflection wave to the signal processing device.

This radar apparatus can flexibly perform the signal processing according to the kind of the reception signal.

According to another aspect of the present invention, a signal processing program for causing a signal processing device to execute processing is provided. The processing includes identifying a kind of a reception signal received by a radar antenna, extracting the reception signal for each kind, and performing individual signal processing for each kind of the extracted reception signal.

Thereby, suitable signal processing can be performed according to the kind of the reception signal. Because the reception signal is extracted for each kind, and the individual signal processing is performed for the kind, the signal processing can be prevented from affecting other kinds of reception signals.

BRIEF DESCRIPTION OF THE DRAWINGS

The present disclosure is illustrated by way of example and not by way of limitation in the figures of the accompanying drawings, in which the like reference numerals indicate like elements and in which.

DESCRIPTION OF EMBODIMENT

Figure 1:
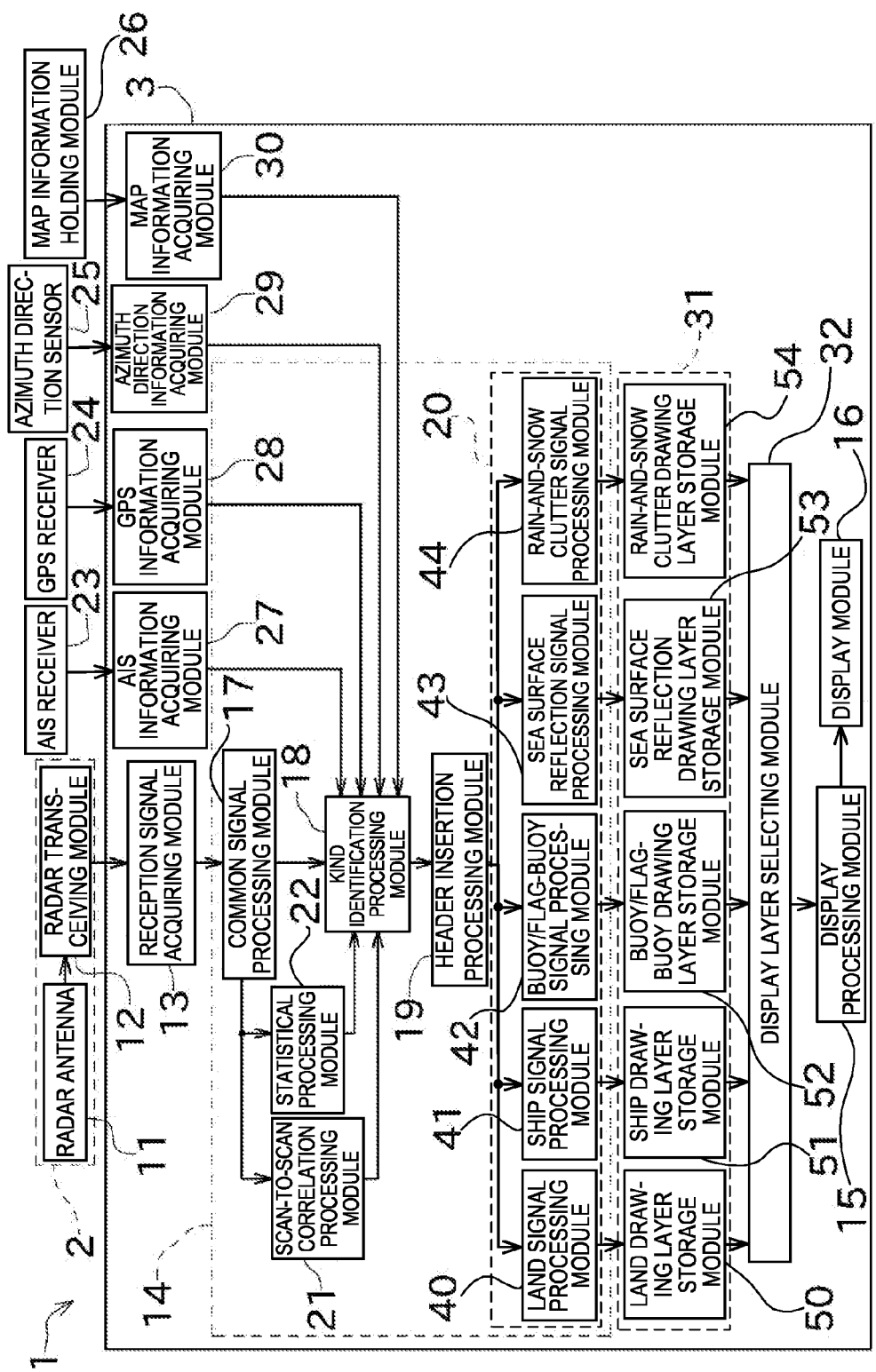
FIG. 1 is a block diagram showing a configuration of a ship radar apparatus according to an embodiment of the present invention.

Next, an embodiment of the present invention is described with reference to the appended drawings. FIG. 1 is a block diagram showing a configuration of a ship radar apparatus 1 of this embodiment.

The ship radar apparatus 1 includes an antenna unit 2 (radar antenna module) provided with a radar antenna 11 and a radar transceiving module 12, and a radar indicator 3 (signal processing device).

The ship radar apparatus 1 is configured as what is called a pulse radar apparatus. That is, the radar antenna 11 transmits a pulse-shaped electric wave having a strong directivity, and receives an echo (reflection wave) produced by the pulse-shaped electric wave reflected on a target object (a source of the echo) and returned to the antenna. The radar antenna 11 repeatedly transmits and receives the electric wave while revolving in a horizontal plane at a predetermined revolving speed. With the above configuration, each scan is performed in the horizontal plane for 360° centering on a ship, which is equipped with the apparatus (hereinafter, referred to as "the ship" or "the ship concerned"), to acquire the situation of the surrounding echo sources.

The reception signal received by the radar antenna 11 is sampled by an A/D conversion module (not illustrated) which the radar transceiving module 12 has, converted into a digital signal, and inputted into the radar indicator 3. In the following description, each sample value as the result of sampling the reception signal may be referred to as "reception data."

The radar indicator 3 mainly includes a reception signal acquiring module 13, a control module 14, a display processing module 15, and a display module 16.

The reception signal acquiring module 13 is an interface for taking the reception signal from the outside into the radar indicator 3 (for example, a connector). The digital reception signal acquired by the reception signal acquiring module 13 is outputted to the control module 14.

The control module 14 performs predetermined signal processing to the reception signal (described later in detail). Therefore, in this embodiment, the radar indicator 3 functions as the signal processing device. Then, the display processing module 15 generates a raster image indicating the situation of the echo sources around the ship concerned (radar image), and outputs it to the display module 16. Therefore, in this embodiment, the radar indicator 3 also functions as a radar image generating device.

Typically, the display module 16 is configured as a liquid crystal display in which a color indication is possible to display the radar image. With the above configuration, the situation of the echo sources around the ship concerned acquired by the radar antenna 11 can be displayed on the display module 16.

Figure 2A:
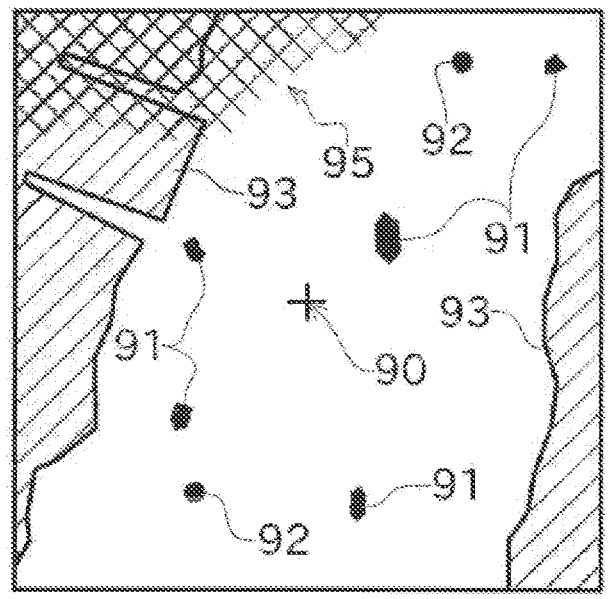
FIG. 2A is a schematic diagram of a radar image displayed on a display module in the ship radar apparatus of this embodiment.

An example of the radar image displayed on the display module 16 is shown in a schematic diagram of FIG. 2A. As shown in FIG. 2A, echo images which indicate ships 91, buoys 92, lands 93, rain-and-snow clutters 95 and the like are displayed centering on a position 90 of the ship concerned (hereinafter, it may also be referred to as "the ship position")

in the radar image. Therefore, an operator of the ship radar apparatus 1 can travel the ship safely by checking the radar image displayed on the display module 16, even in a situation where it is difficult for the operator to check the surroundings by naked eyes at night, for example.

Figure 2B:
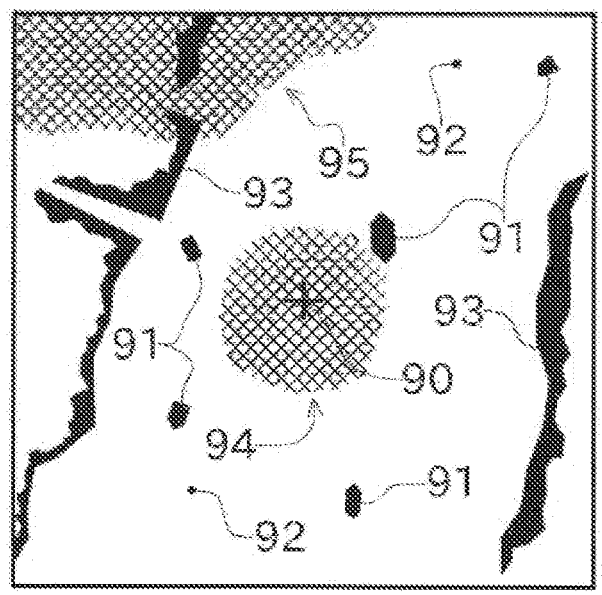
FIG. 2B is a schematic diagram of a radar image in a conventional radar apparatus.

In order to show the comparison with the radar image by the ship radar apparatus 1 of this embodiment, an example of a radar image by a conventional radar apparatus is shown in a schematic diagram of FIG. 2B. As shown in FIG. 2B, the conventional radar apparatus displays sea surface reflections 94 which cause an unnecessary echo image. In addition, because the buoys 92 and the like cause a low echo signal level and echo images produced by the buoys are small, the operator may overlook the images. In addition, the radar image of the conventional radar apparatus causes a problem in which it is difficult for the operator to grasp the exact outline shapes (coastlines) of the lands 93. One of the lands 93 is buried in the echo image of the rain-and-snow clutter 95, and it makes even more difficult to grasp the land shape.

In such a case, if the gain control is performed by the conventional radar apparatus to suppress the sea surface reflections, the rain-and-snow clutters and the like as already described, it also suppresses necessary signals. Specifically, if the gain control is performed to suppress the sea surface reflections and the rain-and-snow clutters by the conventional radar apparatus, another problem is caused in which the weak echo signal images, such as the buoys 92 in FIG. 2B, are no longer displayed in the radar image.

On the other hand, as shown in FIG. 2A, this embodiment can avoid the echo images of the sea surface reflections from being displayed. That is, it is possible to suppress only the unnecessary signals (sea surface reflections), leaving the necessary signals (ships, buoys, lands, etc.). Because the echo images of the rain-and-snow clutters are important information to travel avoiding the rain clouds, they are displayed while their signal levels are suppressed, without being completely suppressed like the sea surface reflections (in the figure, the strengths of the signal levels are expressed by intervals of hatchings). As shown in FIG. 2A, like the buoys 92, echo images which are small and hard to see can be displayed enlarged (comparing with the conventional radar image of FIG. 2B). Further, the outlines of the lands 93 are emphasized by thickening the coastlines and the areas of the lands are filled with color (in this figure, filled with hatchings). Therefore, the outline shapes of the lands 93 can be correctly grasped. As described above, the radar apparatus of this embodiment is configured to flexibly adjust the echo images according to the kinds of echo sources.

Next, the configuration for adjusting the echo images for every kind is described in detail.

First, a configuration of the control module 14 is described. The control module 14 is constituted with hardware, such as a CPU, a RAM and a ROM (not illustrated), and software, such as a signal processing program stored in the RAM. The signal processing program includes a common signal processing step, an identifying step, an extracting step, a header insertion processing step, a kind-base signal processing step, a scan-to-scan correlation processing step, and a statistical processing step, etc. By the hardware and the software cooperating, the control module 14 can function as a common signal processing module 17, a kind identification processing module 18, a header insertion processing module 19, a kind-base signal processing module 20, a scan-to-scan correlation processing module 21, and a statistical processing module 22, etc. Hereinafter, these components are described in detail with reference to the block diagram of FIG. 1.

The common signal processing module 17 performs processing such as noise removal and interference removal for the reception signal inputted from the reception signal acquiring module 13. The processing of the common signal processing module 17 corresponds to the common signal processing step of the signal processing program. The reception signal for which the processing such as the noise removal is applied is outputted to the kind identification processing module 18.

The kind identification processing module 18 performs processing for identifying the kind of the reception signal, for the reception signal outputted from the common signal processing module 17. In this embodiment, the processing for identifying the kind of reception signal is performed for each of the reception data. More specifically, the processing performed by the kind identification processing module 18 identifies the kind of echo source on which a signal is reflected, where the signal is sampled to produce each reception data. The processing of the kind identification processing module 18 corresponds to the identifying step of the signal processing program.

Here, in the case of the ship radar apparatus 1 of this embodiment, the reception signal received by the radar antenna 11 may include a signal indicating the echo based on the sea surface reflection, a signal indicating the echo based on the rain-and-snow clutter, a signal indicating the echo from another ship, a signal indicating the echo from a land, a signal indicating the echo from a buoy or a flag buoy, and an echo of a side lobe. Thus, because two or more possibilities may be considered as the kind of reception signal, the kind of reception signal is identified by using the combination of two or more methods in this embodiment.

Broadly, the method of identifying the kind of reception signal can be divided into two methods in this embodiment: a method of identifying the kind by using information other than the reception data; and a method of identifying the kind based on information obtained by applying predetermined processing to the reception data.

First, the method of using the information other than the reception data is described. In this embodiment, AIS information and map information are mainly used as the information other than the reception data. For this reason, an AIS receiver 23, a GPS receiver 24, an azimuth direction sensor 25, and a map information holding module 26 are connected with the ship radar apparatus 1.

The AIS receiver 23 receives AIS signals transmitted from other ships. The AIS (Universal Shipborne Automatic Identification System) is a system for transmitting positional information, traveling information and the like on a ship to the circumference by wireless communications, and, by receiving similar information from other ships, the system can be acquired information on the positions and the like of other ships (AIS information). The AIS receiver 23 outputs the received AIS information to the ship radar apparatus 1. An AIS information acquiring module 27 which the ship radar apparatus 1 equips acquires the AIS information.

The GPS receiver 24 receives GPS signals from GPS Satellites to acquire information on the position of the ship concerned (absolute position based on the earth), and outputs it to the ship radar apparatus 1. A GPS information acquiring module 28 which the ship radar apparatus 1 equips acquires the information on the ship position.

The azimuth direction sensor 25 acquires the bow direction of the ship concerned (absolute bearing based on the earth), and outputs it to the ship radar apparatus 1. An azimuth direction information acquiring module 29 which the ship radar apparatus 1 equips acquires the information on the bow direction.

The map information holding module 26 is a storage medium or an external instrument that stores the map information (electronic nautical chart or coastline data). A map information acquiring module 30 which the ship radar apparatus 1 equips reads out the map information from the map information holding module 26 to acquire the contents stored therein.

The information acquired by the AIS information acquiring module 27, the information acquired by the GPS information acquiring module 28, the information acquired by the azimuth direction information acquiring module 29, and the information acquired by the map information acquiring module 30 are inputted into the kind identification processing module 18, respectively.

The kind identification processing module 18 identifies whether each reception data indicates an echo from a ship based on the AIS information acquired by the AIS information acquiring module 27. Specifically, it is as follows.

It is well known that, in a pulse radar apparatus like the ship radar apparatus 1, a distance r to an echo source (a ship, a land, etc.) can be acquired based on a time period from the transmission of the electric wave to the reception of the echo. Based on the direction of the antenna when the echo is received, an azimuth direction θ of the echo source seen from the ship concerned can be acquired. That is, the position of the echo source corresponding to each reception data can be acquired by polar coordinates (r, θ). In the meantime, positions of other ships surrounding the ship concerned can be acquired based on the AIS information.

Therefore, the position (r, θ) of the echo source corresponding to each reception data is compared with the positions of other ships (surrounding ships) acquired based on the AIS information to identify whether the reception data indicates an echo from a ship (whether the kind of the reception data is a ship or not).

Note that the position of the echo source acquired by the radar apparatus is relative positional information centering on the ship concerned. On the other hand, the positions of other ships acquired based on the AIS information are absolute positional information based on the earth. Therefore, in order to compare the both, the absolute positional information of other ships based on the AIS need to be converted into the relative positional information centering on the ship concerned. For this reason, the kind identification processing module 18 compares the absolute positional information of other ships acquired based on the AIS information with the relative positional information of the echo source acquired by the radar apparatus, after the absolute positional information is converted into the relative positional information using the GPS information and the azimuth direction information.

The kind identification processing module 18 identifies whether each reception data indicates an echo from a land based on the map information acquired by the map information acquiring module 30. Specifically, it is as follows.

The map information includes data that expresses information on the shape, the position and the like of the land by the absolute coordinates based on the earth. Therefore, the kind identification processing module 18 compares the position of the echo source corresponding to each reception data with the information on the position and shape of the land acquired based on the map information to identify whether the reception data indicates the echo from the land (whether the kind of the reception data is the land or not). Because the information included in the map information is expressed by the absolute coordinates based on the earth, the kind identification processing module 18 compares the position and shape of the land acquired based on the map information with the positional information of the echo source acquired by the radar apparatus, after converting the position and shape of the land into the relative information similar to the case of the AIS information.

Next, the method of identifying the kind of reception signal based on the information acquired by applying predetermined processing to the reception data is described. In this embodiment, as the method of identifying the kind, a method of identifying the kind based on the processed result of the scan-to-scan correlation processing module 21, a method of identifying the kind based on the processed result of the statistical processing module 22, and a method of identifying the kind by recognizing an appearing pattern of the signal are adopted.

The scan-to-scan correlation processing module 21 performs scan-to-scan correlation processing to the reception data for which the noise removal and the like is applied by the common signal processing module 17. The processing of the scan-to-scan correlation processing module 21 corresponds to the scan-to-scan correlation processing step of the signal processing program.

Because the scan-to-scan correlation processing is known in the art, detailed description thereof is omitted herein. However, it is processing in which a correlation between the latest reception signal and the past reception signal is taken to suppress signals which vary at random with time (signals having low correlations with the past reception signals), leaving signals stably detected with time (signals having high correlations with the past reception signals). Here, the signals stably detected with time include the echoes from a ship, a buoy, and a land, etc. On the other hand, the signals varying at random with time include the echoes based on sea surface reflections. Therefore, only the signals based on the sea surface reflections can be suppressed by performing the scan-to-scan correlation processing for the reception signals.

The reception signal for which the scan-to-scan correlation processing is applied is outputted to the kind identification processing module 18 from the scan-to-scan correlation processing module 21. As described above, because only the sea surface reflection is suppressed for the reception signal after the scan-to-scan correlation processing, the kind identification processing module 18 checks the reception data for which the signal level is suppressed to detect the reception data indicating the echo based on the sea surface reflection. By this method, the kind identification processing module 18 identifies whether each reception data indicates the sea surface reflection (whether the kind of reception data is the sea surface reflection or not). As described above, because the scan-to-scan correlation processing module 21 performs processing for identifying the reception data indicating the sea surface reflection, it can be said that the scan-to-scan correlation processing module 21 is a sea surface reflection detecting module.

Among the reception signals after the scan-to-scan correlation processing, a signal for which the signal level is not suppressed is the signal which is stably detected with time (a signal indicating the echo from a ship, a buoy or a flag buoy, a land, etc.). Here, the reception data indicating the echo from a ship and the reception data indicating the echo from a land can be discriminated by the method already described. Therefore, the kind identification processing module 18 identifies reception data which is identified as not being a ship nor a land as reception data indicating a buoy (or a flag buoy), among the reception data for which the signal level is not suppressed by the scan-to-scan correlation processing.

The statistical processing module 22 acquires statistical information for the reception signal for which the noise removal and the like is applied by the common signal processing module 17. The processed result of the statistical processing module 22 is outputted to the kind identification processing module 18. The kind identification processing module 18 identifies whether each reception data indicates a rain-and-snow clutter based on the statistically processed result outputted from the statistical processing module 22 (whether the kind of reception data is the rain-and-snow clutter or not). As described above, because the statistical processing module 22 performs the processing for identifying the reception data indicating the rain-and-snow clutter, it can be said that the statistical processing module 22 is a rain-and-snow clutter detecting module.

Hereinafter, the above-mentioned processing is described briefly. That is, the reception signal indicating the echo based on the rain-and-snow clutter has a certain tendency. Therefore, the statistical information of the signal level of the reception data contained within a certain distance range is extracted, and if the statistical information is in agreement with the pattern indicated by the echo based on the rain-and-snow clutter, the kind identification processing module 18 determines that the reception data within the distance range indicates the echo based on the rain-and-snow clutter (For example, a histogram of the signal level of the reception data contained within a certain distance range is obtained, and if the histogram indicates a predetermined pattern, the reception data within the distance range is determined to indicate the echo based on the rain-and-snow clutter).

Echoes of side lobes appear by a predetermined pattern near an echo of a main lobe. The kind identification processing module 18 recognizes whether each reception data follows the appearing pattern to identify whether the reception data indicates the echo of the side lobe.

With the above configuration, the kind identification processing module 18 can identify which echo each reception data indicates among the echo based on the sea surface reflection, the echo based on a rain-and-snow clutter, the echo from a ship, the echo from a land, the echo from a buoy (or a flag buoy), and the echo of a side lobe. That is, because the kind identification processing module 18 identifies the kind of each reception data, it can be said that the kind identification processing module 18 identifies the kind of reception signal. For example, if it is raining on a land, one reception data may indicate both the echo based on the rain-and-snow clutter and the echo from the land. Therefore, one reception data may be classified into two or more kinds. The identified result of the kind of each reception data by the kind identification processing module 18 is outputted to the header insertion processing module 19.

The header insertion processing module 19 (identifier granting module) gives header information (identifier) indicating the kind of each reception data. The processing of the header insertion processing module 19 corresponds to the header inserting step of the signal processing program.

The header information is preferred to be configured as a bit flag for 6 bits, for example. For instance, the 0th bit is set to a land flag, the 1st bit to a ship flag, the 2nd bit to a buoy/flag-buoy flag, the 3rd bit to a sea surface reflection flag, the 4th bit to a rain-and-snow clutter flag, and the 5th bit to a side lobe flag. In this case, header information "000010" is given to the reception data indicating the echo from a ship (here, the right end bit is set to the 0th bit). In addition, header information "010001" may be given to the reception data indicating both the echo from the land and the echo based on the rain-and-snow clutter, for example.

Figure 3:
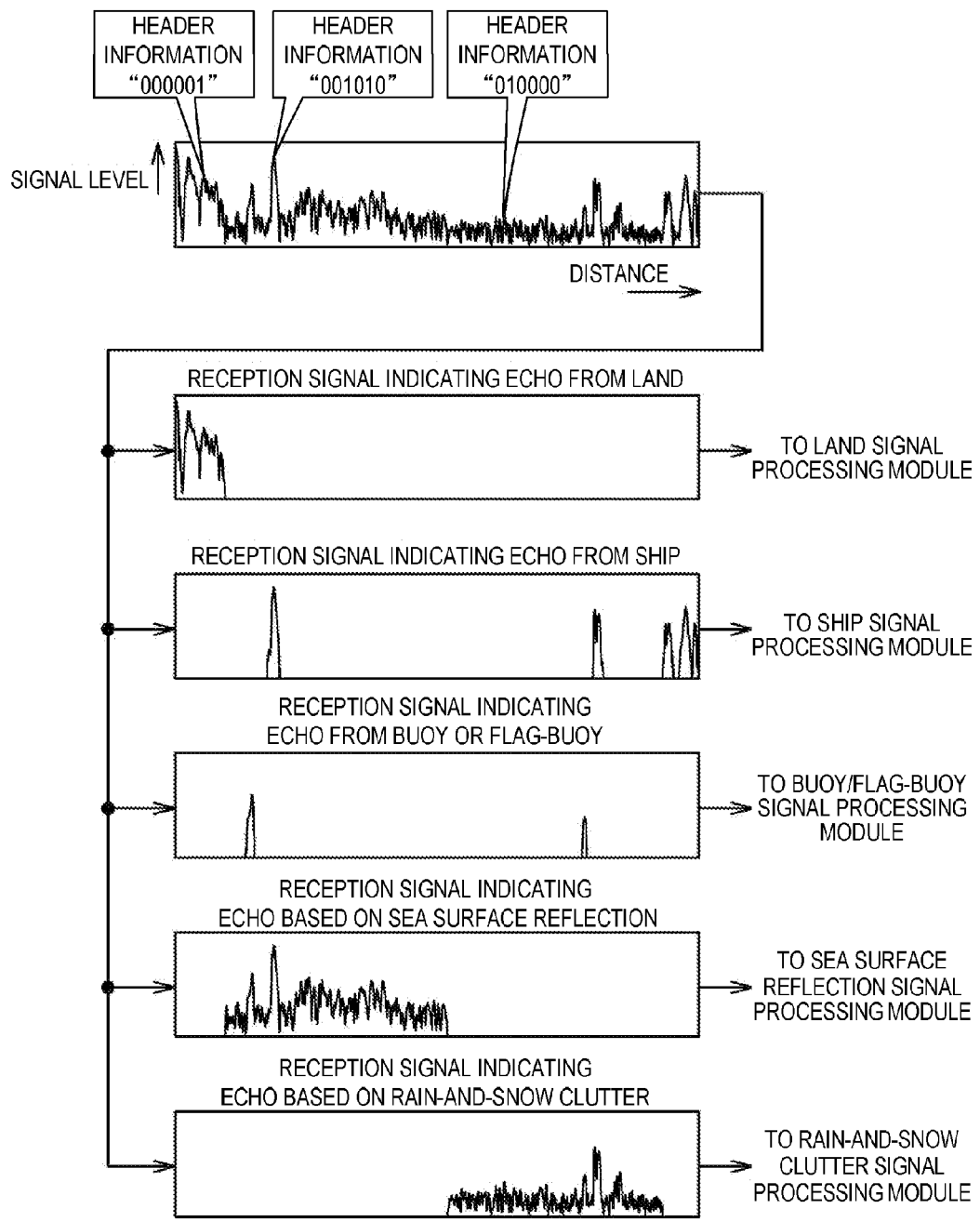
FIG. 3 is a conceptual diagram showing a reception signal being extracted for each kind.

An example in which the header information is given to the reception data is shown in the top of FIG. 3. In the figure, an example waveform of the reception signals which are received during one sweep (operation from a single transmission of the pulse-shaped electric wave to a reception of the echo), where the vertical axis indicates the signal level and the horizontal axis indicates the distance to the echo source. Although the header information only on a part of the reception signal is shown in FIG. 3, the header information is given in fact to every reception data for which the reception signal is sampled. The reception data to which the header information is given is outputted to the kind-base signal processing module 20.

The kind-base signal processing module 20 includes a land signal processing module 40 for performing signal processing to the reception signal indicating the echo from a land, a ship signal processing module 41 for performing signal processing to the reception signal indicating the echo from a ship, a buoy/flag-buoy signal processing module 42 for performing signal processing to the reception signal indicating the echo from a buoy (or a flag buoy), a sea surface reflection signal processing module 43 for performing signal processing to the reception signal indicating the echo by a sea surface reflection, and a rain-and-snow clutter signal processing module 44 for performing signal processing to the reception signal indicating the echo by a rain-and-snow clutter. Because the echoes of the side lobes are unnecessary fake images, the signal processing to the reception signal indicating the echo of the side lobe is not carried out.

When the reception data with the header information is inputted, the kind-base signal processing module 20 acquires the kind of the reception data based on the header information, and outputs the reception data to the signal processing module corresponding to the kind among the signal processing modules 40-44. For example, because the reception data where the 0th bit of the bit flag is "1" (land flag) is reception data indicating the echo from the land, it is outputted to the land signal processing module 40. For example, because the reception data where the 1st bit of the bit flag is "1" (ship flag) is reception data indicating the echo from the ship, it is outputted to the ship signal processing module 41.

Because the above processing is carried out for all the reception data, if the whole waveform of the reception signals is considered, reception signals classified by the kinds are extracted from the original reception signals, and individual signal processing is performed for each of the reception signals classified by the kinds. This processing is conceptually shown in FIG. 3. As shown in FIG. 3, from the reception signals shown in the top (first row) (reception signals to which the header information is given), the reception signal indicating the echo from the land, the reception signal indicating the echo from the ship, and the reception signal indicating the echo from the buoy (or the flag buoy), the reception signal indicating the echo based on the sea surface reflection, and the reception signal indicating the echo based on the rain-and-snow clutter are extracted. The extracted reception signals are inputted into the respective signal processing modules corresponding to the kinds of the reception signals. Thus, the kind-base signal processing module 20 can be said that it is an extracting module for extracting a signal for every kind Note that the processing of the kind-base signal processing module 20 as the extracting module corresponds to the extracting step of the signal processing program.

Hereinafter, signal processing to be performed by each of the signal processing modules 40-44 is described in detail.

Note that the processing of the signal processing modules 40-44 corresponds to the kind-base signal processing step of the signal processing program.

Because only the reception data indicating the echo from the land is inputted to the land signal processing module 40, processing peculiar to the echo from the land can be performed. Specifically, the land signal processing module 40 performs processing for amplifying the signal level of the reception data from an area corresponding to a coastline, for example. Thus, because the echo image for which the coastline is emphasized can be displayed on the radar image, the operator can correctly grasp the outline shape of the land (coastline). Alternatively, the land signal processing module 40 may perform processing in which the signal level of the inputted reception data is set to be constant. Thereby, because the echo image of the land area is displayed so that it is uniformly painted out on the radar image, the operator can easily recognize the existence of the land.

Because only the reception data indicating the echo from the ship is inputted to the ship signal processing module 41, it can perform processing peculiar to the echo from the ship. Specifically, the land signal processing module 40 performs processing for raising the signal level of the inputted reception data, for example (raising a gain). Thereby, the echo image indicating the echo from the ship can be displayed so as to be emphasized on the radar image. Alternatively, processing for sharpening the outline of the echo image may be performed.

Because only the reception data indicating the echo from the buoy or the flag buoy is inputted to the buoy/flag-buoy signal processing module 42, it can perform processing peculiar to the echo from the buoy (or the flag buoy). Specifically, the buoy/flag-buoy signal processing module 42 performs echo expansion (echo stretch) processing, for example. Thereby, even if it is a small target object like the buoy or the flag buoy, the echo image can be displayed large in size so that the operator is easy to see it on the radar image.

Because only the reception data indicating the echo based on the sea surface reflection is inputted to the sea surface reflection signal processing module 43, it can perform processing peculiar to the echo based on the sea surface reflection. Specifically, the sea surface reflection signal processing module 43 performs processing for lowering the signal level of the reception data, for example (processing for lowering the gain). Thereby, it can prevent the sea surface reflections from being displayed on the radar image.

Because only the reception data indicating the echo based on the rain-and-snow clutter is inputted to the rain-and-snow clutter signal processing module 44, it can perform processing peculiar to the reception signal indicating the echo based on the rain-and-snow clutter. Specifically, the rain-and-snow clutter signal processing module 44 performs processing for lowering the signal level of the reception data, for example (processing for lowering the gain). Thereby, it can prevent the rain-and-snow clutters from being displayed on a radar image. Alternatively, the rain-and-snow clutter signal processing module 44 may perform the processing for raising the gain according to an operator's selection. Thereby, because an area where rain is falling can be clearly displayed on the radar image, it can also support the needs to travel on the course where rain clouds are avoided.

As described above, because the signal processing is selectively performed according to the kind of reception data, one signal processing does not affect the reception data of other kinds For example, even if the processing for lowering the gain is performed to the reception data indicating the echo based on the sea surface reflection, the gain of the other kind of the reception data is not lowered. Therefore, because the signal processing which is independent for each kind of the reception data can be performed, the echo image can be flexibly adjusted, and, thereby, the radar image where information necessary to the operator can be generated to be clearly displayed.

Next, a configuration for generating the radar image is described.

Each of the signal processing modules 40-44 outputs the signal-processed reception data to an image memory 31, after performing the signal processing described above. Thereby, the image memory 31 stores a raster image indicating the situation of the echo sources around the ship concerned.

Although the method of generating the raster image based on the reception data is well known in the art, it is described briefly below. As described above, the position of the echo source indicated by the reception data is acquired by polar coordinates. On the other hand, the position of each pixel of the raster image is expressed by rectangular coordinates. For this reason, when outputting the reception data to the image memory, the position of the echo source expressed by the polar coordinates is converted into rectangular coordinates, and a pixel address corresponding to the position is specified and outputted. Thereby, an echo image is plotted at suitable pixels in the raster image stored in the image memory. Then, this processing is performed for the reception data for one revolution of the radar antenna to generate the raster image indicating the situation of the echo sources around the ship concerned.

The image memory 31 can store two or more raster image data. Herein, each of the two or more of image data may be called a "layer." The layer is prepared for every kind of the reception signal. That is, the image memory 31 includes a land drawing layer storage module 50 for storing a land layer, a ship drawing layer storage module 51 for storing a ship layer, a buoy/flag-buoy drawing layer storage module 52 for storing a buoy layer (or a flag buoy layer), a sea surface reflection drawing layer storage module 53 for storing a sea surface reflection layer, and a rain-and-snow clutter drawing layer storage module 54 for storing a rain-and-snow clutter layer.

Here, the "land layer" is a raster image generated based on the reception data outputted from the land signal processing module 40. The "ship layer" is a raster image generated based on the reception data outputted from the ship signal processing module 41. The "buoy layer (or flag buoy layer)" is a raster image generated based on the reception data outputted from the buoy/flag-buoy signal processing module 42. The "sea surface reflection layer" is a raster image generated based on the reception data outputted from the sea surface reflection signal processing module 43. The "rain-and-snow clutter layer" is a raster image generated based on the reception data outputted from the rain-and-snow clutter signal processing module 44.

As described above, because the reception data for which each of the signal processing modules 40-44 performs the signal processing is obtained by extracting only the specific kind of reception data, the signal-processed reception data outputted from each of the signal processing modules 40-44 contains only the specific kind of reception data, respectively. Further, the reception data outputted from each of the signal processing modules 40-44 is obtained by performing the signal processing according to the kind of the reception signal concerned. Accordingly, each of the layer storage modules 50-54 for every kind stores the raster image for which the echo image is adjusted for each kind (refer to the left-hand side of FIG. 4). Note that, as described above, because the raster image can be finally generated by executing the signal processing program of this embodiment, it can be also said that the signal processing program of this embodiment is a radar image generation program.

For example, the land layer stored in the land drawing layer storage module 50 contains only the echo image indicting the land, and, moreover, in the echo image, the coastline area is emphasized by the signal processing of the land signal processing module 40. Similarly, for example, the buoy layer (or the flag buoy layer) stored in the buoy/flag-buoy drawing layer storage module 52 contains only the echo image indicating the buoy or the flag buoy, and, moreover, the echo image is expanded by the signal processing of the buoy/flag-buoy signal processing module 42. Thus, the echo image contained in each layer is appropriately adjusted according to the kind of the echo image.

A display layer selecting module 32 is inputted with a display layer selection signal indicating a layer to be displayed which is specified by the operator among the layers stored in the layer storage modules 50-54. The display layer selecting module 32 selects some or all layers according to the display layer selection signals, reads out the selected layers from the image memory 31, and outputs them to the display processing module 15. The display processing module 15 stacks (superimposes) the respective layers outputted from the display layer selecting module 32, and performs processing for generating a single raster image (radar image). The radar image generated by the display processing module 15 is transmitted to and displayed on the display module 16.

Figure 4:
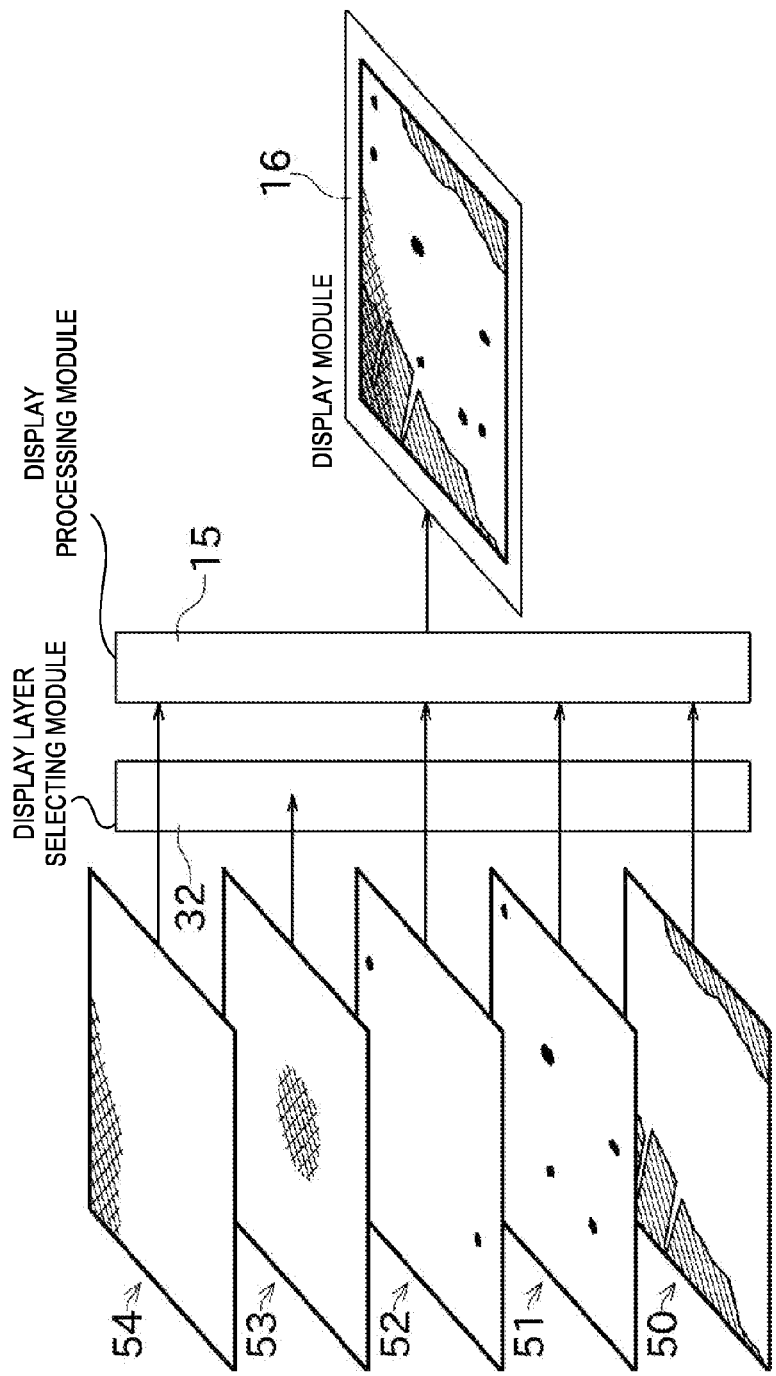
FIG. 4 is a conceptual diagram showing a generation of a radar image by synthesizing layers.

FIG. 4 conceptually shows processing for generating the radar image. In FIG. 4, the case where the operator sets such that the sea surface reflections are not displayed on the radar image is shown. In this case, the display layer selecting module 32 reads out layers from the layer storage modules 50, 51, 52, and 54 other than the sea surface reflection drawing layer storage module 53, and outputs them to the display processing module 15. Thereby, because the sea surface reflection layer is not outputted to the display processing module 15, a radar image without containing the echo images indicating the sea surface reflections can be generated by performing the processing for stacking the layers by the display processing module 15.

Note that the configuration for superimposing two or more images and displaying the superimposed image on a display module is disclosed in JP 2003-279641(A) described above, for example. However, JP 2003-279641(A) uses a radar image with a single layer. Therefore, unlike this embodiment, it cannot perform the processing for not selectively displaying the echo image of the specific kind. In this regard, in this embodiment, because the ship radar apparatus 1 divides the radar image into two or more layers, it is possible to select "display/non-display" for every layer.

Further, the echo images are adjusted according to the respective kinds for the layers outputted from the display layer selecting module 32 (the land layer, the ship layer, the buoy layer (or the flag buoy layer), and the rain-and-snow clutter layer). Therefore, by superimposing the layers in the display processing module 15, the radar image for which the echo images are adjusted according to the kinds (refer to FIG. 2A) can be finally generated to be displayed on the display module 16.

As described above, the radar indicator 3 includes the reception signal acquiring module 13, the kind identification processing module 18, and the kind-base signal processing module 20. The reception signal acquiring module 13 acquires the reception signal received by the radar antenna 11. The kind identification processing module 18 identifies the kind of the reception signal. The kind-base signal processing module 20 extracts the reception signals for every kind. The kind-base signal processing module 20 performs the individual signal processing for every kind of the extracted reception signal.

Thereby, suitable signal processing can be performed according to the kind of the reception signal. Because the reception signal is extracted for every kind and the individual signal processing is performed, the signal processing can be prevented from affecting other kinds of reception signals. Therefore, flexible signal processing is possible, for example, when the gain control is performed as the signal processing, only arbitrary kinds of reception signals can be selectively suppressed.

In the radar indicator 3 of this embodiment, the kind identification processing module 18 can identify the land, the ship, the buoy (or the flag buoy), the sea surface reflection, and the rain-and-snow clutter as the kinds of reception signals.

Thus, suitable signal processing according to the kind can be performed by identifying the kind of reception signal based on the origination of the echo indicated by the reception signal.

In this embodiment, the radar indicator 3 includes the map information acquiring module 30 for acquiring the map information. The kind identification processing module 18 identifies the kind of reception signal based on the map information.

Thereby, the kind of reception signal can be identified with sufficient accuracy based on the map information.

In this embodiment, the radar indicator 3 is configured as follows. The kind identification processing module 18 identifies the reception signal indicating the land based on the map information. The kind-base signal processing module 20 performs signal processing for the reception signal indicating the land, which is different from signal processing for other kinds of reception signals.

Specifically, because the map information contains the information indicating at least the position and the shape of the land, the reception signal indicating the land can be identified with sufficient accuracy based on the map information. Thereby, because the reception signal indicating the land can be extracted, the processing peculiar to the reception signal indicating the land can be performed without affecting other kinds of reception signals.

In this embodiment, the radar indicator 3 includes the AIS information acquiring module 27 for acquiring the AIS information. The kind identification processing module 18 identifies the kind of reception signal based on the AIS information.

Thereby, the kind of reception signal can be identified with sufficient accuracy based on the AIS information.

In this embodiment, the radar indicator 3 is configured as follows. Specifically, the kind identification processing module 18 identifies the reception signal indicating the ship based on the AIS information. The kind-base signal processing module 20 performs signal processing for the reception signal indicating the ship, which is different from signal processing for other kinds of reception signals.

Because the AIS information contains the information showing the position of the ship, the reception signal indicating the ship can be identified with sufficient accuracy based on the AIS information. Thereby, because the reception signal indicating the ship can be extracted, the processing peculiar to the reception signal indicating the ship can be performed without affecting other kinds of reception signals.

In this embodiment, the radar indicator 3 includes the scan-to-scan correlation processing module 21 for identifying the reception signal indicating the sea surface reflection. The kind-base signal processing module 20 performs signal processing for the reception signal indicating the sea surface reflection, which is different from signal processing for other kinds of reception signals.

Because the reception signal indicating the sea surface reflection can be extracted, processing peculiar to the reception signal indicating the sea surface reflection can be performed without affecting other kinds of reception signals.

In this embodiment, the radar indicator 3 includes the statistical processing module 22 for identifying the reception signal indicating the rain-and-snow clutter. The kind-base signal processing module 20 performs signal processing for the reception signal indicating the rain-and-snow clutter, which is different from signal processing for other kinds of reception signals.

Because the reception signal indicating the rain-and-snow clutter can be extracted, processing peculiar to the reception signal indicating the rain-and-snow clutter can be performed without affecting other kinds of reception signals.

In this embodiment, the radar indicator 3 includes the display processing module 15 for synthesizing the reception signals for every kind for which the signal processing is carried out by the kind-base signal processing module 20 to generate the radar image.

That is, by synthesizing the reception signals for which the signal processing is applied according to the kind, the radar image for which the echo image is adjusted for every kind can be obtained.

In this embodiment, the radar indicator 3 includes the image memory 31 and the display layer selecting module 32. The image memory 31 can store the reception signals for every kind for which the signal processing is carried out by the kind-base signal processing module 20, in the layers prepared for every kind. The display layer selecting module 32 selects some or all layers among the layers for every kind based on the display layer selection signals inputted from the exterior. The display processing module 15 synthesizes the layers selected by the display layer selecting module 32 to generate the radar image.

Thereby, it is possible by the operator's selection to prevent the unnecessary layer from being displayed.

In this embodiment, the radar indicator 3 includes the header insertion processing module 19 for giving the header information according to the kind of the reception signal to the reception signal. The kind-base signal processing module 20 extracts the reception signals for every kind based on the header information.

Thus, by giving the identifier to the reception signal, the reception signal can be easily extracted for every kind by the kind-base signal processing module 20.

In this embodiment, the ship radar apparatus 1 includes the antenna unit 2 and the radar indicator 3. The antenna unit 2 transmits the electromagnetic wave and receives the reflection wave to output the reception signal corresponding to the received reflection wave to the radar indicator 3.

The radar apparatus can flexibly perform the signal processing according to the kind of the reception signal.

In this embodiment, the signal processing program causes the signal processing device to execute processing including the following steps. This signal processing program includes the identifying step, the extracting step, and the kind-base signal processing step. At the identifying step, the kind of the reception signal received by the radar antenna 11 is identified. At the extracting step, the reception signal is extracted for every kind. At the kind-base signal processing step, the individual signal processing is performed for every kind of the extracted reception signals.

Thereby, suitable signal processing can be performed according to the kind of reception signal. Because the reception signal is extracted for every kind to perform the individual signal processing, the signal processing can be prevented from affecting other kinds of reception signals.

One embodiment of the present invention is described above; however, the configuration of the embodiment may be modified as follows.

Although the control module 14 is configured with the hardware such as the CPU, ROM and RAM, and the software such as the program, it may be configured with dedicated hardware.

The radar apparatus of this embodiment may be applied to other kinds of radar apparatuses other than the ship radar apparatus described above. The radar apparatus of this embodiment may also be applied to an FMCW radar other than the pulse-radar-type radar apparatus.

The signal processing device of this embodiment is not limited to the radar indicator provided with the display module. For example, it may not have the display module but the data of the generated radar image may be outputted to an external display.

When generating the radar image by the display processing module 15, the image processing method at the time of stacking the layers may be changed by an operator's selection.

For example, when performing the processing for stacking the layers by the display processing module 15, a transparency of each layer may be specified by the operator. In this case, if the rain-and-snow clutter layer is specified to be displayed translucently, the situation in which it is raining on a ship or a land can be expressed on the radar image.

Further, when performing the processing for stacking the layers by the display processing module 15, a color tone or the like may be specified for each layer by the operator. By configuring in this way, the radar image can be adjusted even more flexibly, such as displaying a layer with low importance for the operator in a low-profile color tone, or displaying an important layer in a high-profile color tone.

Note that, in the case where the display processing module 15 can adjust the color tone of the layer as described above, it may be more suitable that the layer unnecessary for the operator is displayed in the low-profile color tone. In this case, because the layer containing the unnecessary echo images (for example, sea surface reflection etc.) is made low in profile, the display layer selecting module 32 may be omitted and all the layers may be outputted to the display processing module 15.

By adjusting the color tone of each layer by the display processing module 15 as described above, because the specific kind of echo image is displayed so as to be emphasized or suppressed, the adjustment processing of the color tone corresponds to the conventional gain control. Therefore, if it is configured so that the color tone of each layer can be adjusted as described above, the gain control performed by the sea surface reflection signal processing module 43 and the like may be omitted.

In the above embodiment, the header insertion processing module 19 gives the header information before the reception data is converted from polar coordinates into rectangular coordinates (that is, before the raster image is generated). However, the header information may be given once the coordinate conversion is performed. In this case, the header information is given to each pixel of the raster image. In this configuration, the processing by the kind-base signal processing module is performed for each pixel of each layer (reception data after being converted into the raster images for the kinds).

The identifier given to the reception signal is not limited to the bit flag. The identifier may be any other information which can specify the kind of the reception signal. However, the bit flag may be especially preferred as the identifier because it requires fewer data and the comparison is easy.

The header insertion processing module 19 may be omitted. In this case, for example, a changeover switch for switching a flow of the signal may be provided between the kind identification processing module 18 and the signal processing modules 40-44, and the changeover switch may be switched according to the kind of reception signal. Thereby, the reception signal may be selectively outputted to any of the signal processing modules 40-44.

The kinds of reception signal identified by the kind identification processing module 18 are not limited to the examples of the above embodiment. For example, without identifying the kind of the target object, such as a ship, a buoy, and a flag buoy, the kind may be classified by a moving speed, such as a moving target object and a stationary target object.

Further, the kind identification processing module 18 may identify a white noise contained in the reception signal. A method of identifying the white noise which is a signal other than the reflection echo from a reflective object may be as follows. For example, first, a signal level of reception signals are measured for a time period during which the electric waves are not transmitted from the radar antenna (time period during which the echoes are not received), and the signal level concerned is set to a white noise level. If a reception signal below the white noise level is detected during a time period during which the echoes are received, the reception signal concerned is identified as the white noise.

The method of identifying the kind of reception signal by the kind identification processing module 18 is not limited to the example of the above embodiment, but any other suitable method may be used.

For example, because the electronic nautical chart also contains positional information on route buoys, reception signals indicating echoes from the route buoys may be identified based on the chart information. Further, for example, in order to identify an echo from a moving target object such as a ship, the information on a trail (trace) may be used. Further, for example, in order to identify echoes based on rain-and-snow clutters, weather information from a satellite radio station may be used. Further, by performing complex signal processing for the reception signal, the kind of the reception signal may be identified based on information on a phase and a frequency which are acquired.

The signal processing performed by the signal processing modules 40-44 are not limited to the examples of the above embodiment, but may be any other signal processing.

For example, the rain-and-snow clutter signal processing module 44 may perform TT (Target Tracking) Because only the reception data indicating the rain-and-snow clutters can be extracted by the configuration of the above embodiment, the TT for the rain-and-snow clutters becomes possible. Note that the TT is a technique in which a course of a target object is predicted by acquiring and tracking the target object on the radar image. Thereby, a ship can travel on the course avoiding rain, while predicting the moving direction and the like of rain clouds.

Further, for example, the ship signal processing module 41 may perform echo trail generation processing. Thereby, because a trail (trace) is generated only for the echo image indicating a ship and the trail is not generated for the sea surface reflections, the trail can be clearly displayed.

The ship signal processing module 41 may not perform any signal processing. Because the configuration of the above embodiment can suppress only the unnecessary signals without suppressing the reception signals indicating the echoes from ships. Therefore, even if it does not perform processing in particular for emphasizing the reception signals indicating the ships, the operator is able to recognize the echo images of the ships easily on the radar image.

Further, for example, the ship signal processing module 41 may perform processing for displaying a mark of a ship at a position where the ship exists.

What kind of signal processing is to be carried out for a kind of the reception signal may vary with the application of the apparatus, preferences of the operator, weather conditions, situations of surrounding target objects, etc. Therefore, it may be preferred that the signal processing by the kind-base signal processing module 20 can be set and changed by the operator, depending on the kind of reception signal. Thereby, the signal processing can be performed flexibly according to the needs of the operator, if needed.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A display device, comprising:
a reception signal acquiring module for acquiring reception signals received by a radar antenna during a single antenna scan;
an identifying module for identifying a target kind of each reception signal;
an extracting module for extracting the reception signal for each identified target kind;
a layer storage that stores the extracted reception signals such that each extracted reception signal is associated with a layer according to the identified target kind, each layer being associated with a particular target kind;
a display layer selector for selecting at least one layer for display; and
a display processor
for generating an individual radar image for each of the selected at least one layer such that each generated individual radar image corresponds to an identified target kind, and
for displaying the generated individual radar image corresponding to the selected at least one layer.

2. The display device of claim 1, wherein the identifying module identifies at least any one of the target kinds associated with the reception signal, the target kinds including a land, a ship, a buoy, a flag buoy, a sea surface reflection, a rain-and-snow clutter, and a white noise.

3. The display device of claim 1, further comprising a map information acquiring module for acquiring map information;
wherein the identifying module identifies the target kind of the reception signal based on the map information.

4. The display device of claims 1, further comprising an AIS information acquiring module for acquiring AIS information;
wherein the identifying module identifies the target kind of the reception signal based on the AIS information.

5. The display device of claims 1, wherein the identifying module identifies the reception signal indicating a sea surface reflection target kind.

6. The display device of claims 1, wherein the identifying module identifies the reception signal indicating a rain-and-snow clutter target kind.

7. The display device of claim 1, the display processor synthesizing each generated individual radar image corresponding to each selected layer to generate a displayed radar image based on the synthesized individual radar images.

8. The display device of claim 1, displaying the generated individual radar image comprising:
performing individual image processing for each generated individual radar image corresponding to a selected layer based on the target kind of the selected layer, the individual image processing including enhancing or suppressing or adjusting one or more of a transparency and a color tone of the individual radar image based on the target kind of the selected layer.

9. The display device of claim 8, performing individual image processing for each generated individual radar image including suppressing the individual radar image associated with a rain-and-snow clutter target kind or a white noise target kind or a sea surface reflection target kind.

10. The display device of claim 8, performing individual image processing for each generated individual radar image including enhancing the individual radar image associated with a ship target kind or a land target kind.

11. The display device of claim 5, further comprising:
a kind-based signal processor for performing sea surface reflection signal processing for an extracted reception signal identified as a sea surface reflection target kind, said sea surface reflection signal processing being different from signal processing for other target kinds.

12. The display device of claim 6, further comprising:
a kind-based signal processor for performing rain-and-snow clutter signal processing for an extracted reception signal identified as a rain-and-snow clutter target kind, said rain-and-snow clutter signal processing being different from signal processing for other target kinds.

13. The display device of claim 1, where:
the display layer selector selects at least two layers for display; and
the display processor generates an individual radar image for each of the selected at least two layers such that each generated individual radar image corresponds to an identified target kind.

14. A method, comprising:
acquiring reception signals received by a radar antenna during a single antenna scan;
identifying a target kind of each acquired reception signal;
extracting the reception signal for each identified target kind;
storing the extracted reception signals in a storage such that each extracted reception signal is associated with a layer according to the identified target kind, each layer being associated with a particular target kind;
selecting at least one stored layer for display;
generating an individual radar image for each of the selected at least one layer such that each generated individual radar image corresponds to an identified target kind, and
displaying the generated individual radar image corresponding to the selected at least one layer.

15. The method of claim 14, the method further comprising:
performing a kind-based signal processing for an extracted reception signal based on the target kind, said kind-based signal processing being different from signal processing for other target kinds.

16. The method of claim 14, the method further comprising:
synthesizing each generated individual radar image corresponding to each selected layer to generate a displayed radar image based on the synthesized individual radar images.

17. The method of claim 14, displaying the generated individual radar images comprising:
performing individual image processing for each generated individual radar image corresponding to a selected layer based on the target kind of the selected layer, the step of performing individual image processing including enhancing or suppressing or adjusting one or more of a transparency and a color tone of the individual radar image based on the target kind of the selected layer.

18. The method of claim 17, performing individual image processing for each generated individual radar image including suppressing the individual radar image associated with a rain-and-snow clutter target kind or a white noise target kind or a sea surface reflection target kind.

19. The method of claim 17, performing individual image processing for each generated individual radar image including enhancing the individual radar image associated with a ship target kind or a land target kind.

20. The method of claim 14, said selecting including selecting at least two layers for display; and generating an individual radar image including generating an individual radar image for each of the selected at least two layers such that each generated individual radar image corresponds to an identified target kind.

21. The method of claim 17, where each of the steps of enhancing, suppressing, and adjusting one or more of a transparency and a color tone of the individual radar image are performed based on an indication of importance associated with the selected layer.

* * * * *